United States Patent [19]
Madden

[11] Patent Number: 5,176,105
[45] Date of Patent: Jan. 5, 1993

[54] FUR GROOMING APPARATUS

[76] Inventor: Marc P. Madden, 20038 Maplewood, Livonia, Mich. 48152

[21] Appl. No.: 739,825

[22] Filed: Aug. 2, 1991

[51] Int. Cl.⁵ .............................................. A01K 13/00
[52] U.S. Cl. ...................................... 119/83; 119/29; 15/160; 15/206
[58] Field of Search .................... 119/29, 29.5, 83, 84, 119/85; 15/207, 206, 160, 161

[56] References Cited

U.S. PATENT DOCUMENTS

| | | | |
|---|---|---|---|
| 984,640 | 2/1911 | Aronis | 15/161 |
| 1,663,778 | 3/1928 | Seeger | 15/206 |
| 1,760,815 | 5/1930 | Cazel | 15/206 |
| 2,183,139 | 12/1939 | Hertzberg | 15/206 |
| 2,865,329 | 12/1958 | Elliott | 119/83 |
| 2,976,841 | 3/1961 | Scheffer | 119/83 |
| 3,837,751 | 9/1974 | Ross | 15/206 |
| 4,177,763 | 12/1979 | Cook | 119/29 |

Primary Examiner—John G. Weiss
Attorney, Agent, or Firm—Reising, Ethington, Barnard, Perry & Milton

[57] ABSTRACT

A fur grooming apparatus includes a base portion (12) and a twisted wire (14) operatively connected to the base portion (12). Brush bristles are retained by and extend radially outwardly from the spiral twist of the wire (14) for brushing a live animal as it passes against the bristles.

9 Claims, 1 Drawing Sheet

FUR GROOMING APPARATUS

TECHNICAL FIELD

This invention relates to a fur brushing apparatus for brushing the fur of a live animal, such as a cat, so as to improve and build up the appearance of the pelt of a live animal and make it unnecessary for the animal to chew knots in its own fur and attempting to remove excessive hairs in hot weather.

BACKGROUND OF THE INVENTION

Animals such as cats are continually plagued with knots in their fur. In the wild, such knots are generally removed by the animals squeezing through tight openings and thus brushing themselves to remove the excessive hair. Animals that remain in the home can only remove this lose or excessive hair by licking and chewing the hair off. The hair forms hair balls in the animals throat, causing choking in the animals as well as other problems.

Various devices have been devised as grooming aids. For example, the U.S. Pat. No. 2,976,841 to Scheffer, issued Mar. 28, 1961, U.S. Pat. No. 2,865,329 to Elliot, issued Dec. 23, 1958, and U.S. Pat. No. 4,807,569 to Leopold, issued Feb. 28, 1989 all relate to pet grooming devices. The Scheffer and Elliot devices both provide brushing means retained in a support whereby when the animal passes through the brushing means, the animal brushes its own fur and removes any excess and undesired hairs.

The problem with the aforementioned prior art devices is that they are made from multiple parts, are expensive to make and expensive to tool.

The present invention provides a simple device which is quite effective for grooming animals passing therethrough or therearound.

SUMMARY OF THE INVENTION

In accordance with the present invention, there is provided a fur grooming apparatus including a base portion and wire means operatively connected to the base portion, at least a portion of the wire means including a spiral twist therein. Bristle means is retained by extending radially outwardly from the spiral twist for brushing a live animal as it passes thereagainst.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 2:
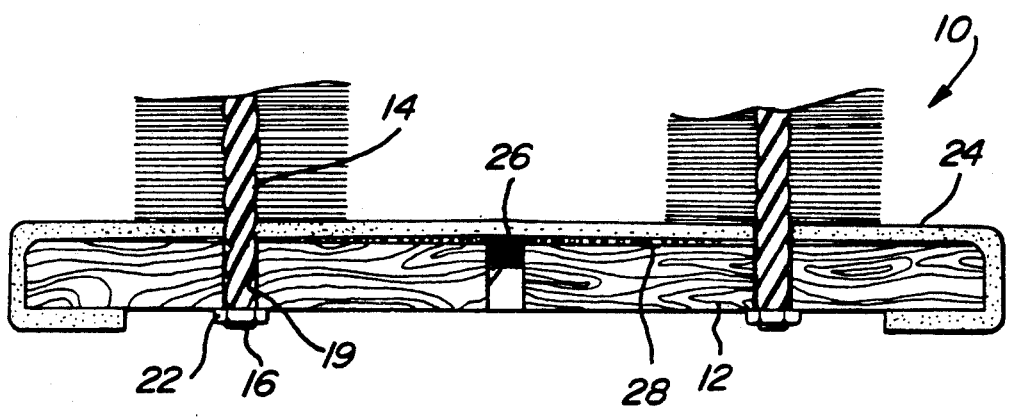
FIG. 2 is an enlarged view partially in cross-section of the connection of the wire portion of the apparatus to the base.

A fur grooming apparatus made in accordance with the present invention is generally shown at 10 in the drawings. Generally, the device includes a base portion 12 and a wire 14 operatively connected to the base portion. As shown in FIG. 2, the connection can be made by either or both of the ends 16,18 (end 16 being shown in the Figure) extending through an opening 19 in the base 12 and being secured thereto by one way hardened washers 22. Of course, other means can be used to fasten the wire 14 to the base as well as the wire taking on various other shapes which may require only one end to extend through the base, such as where one end of the wire 14 is connected directly to the other end of the wire.

Figure 1:
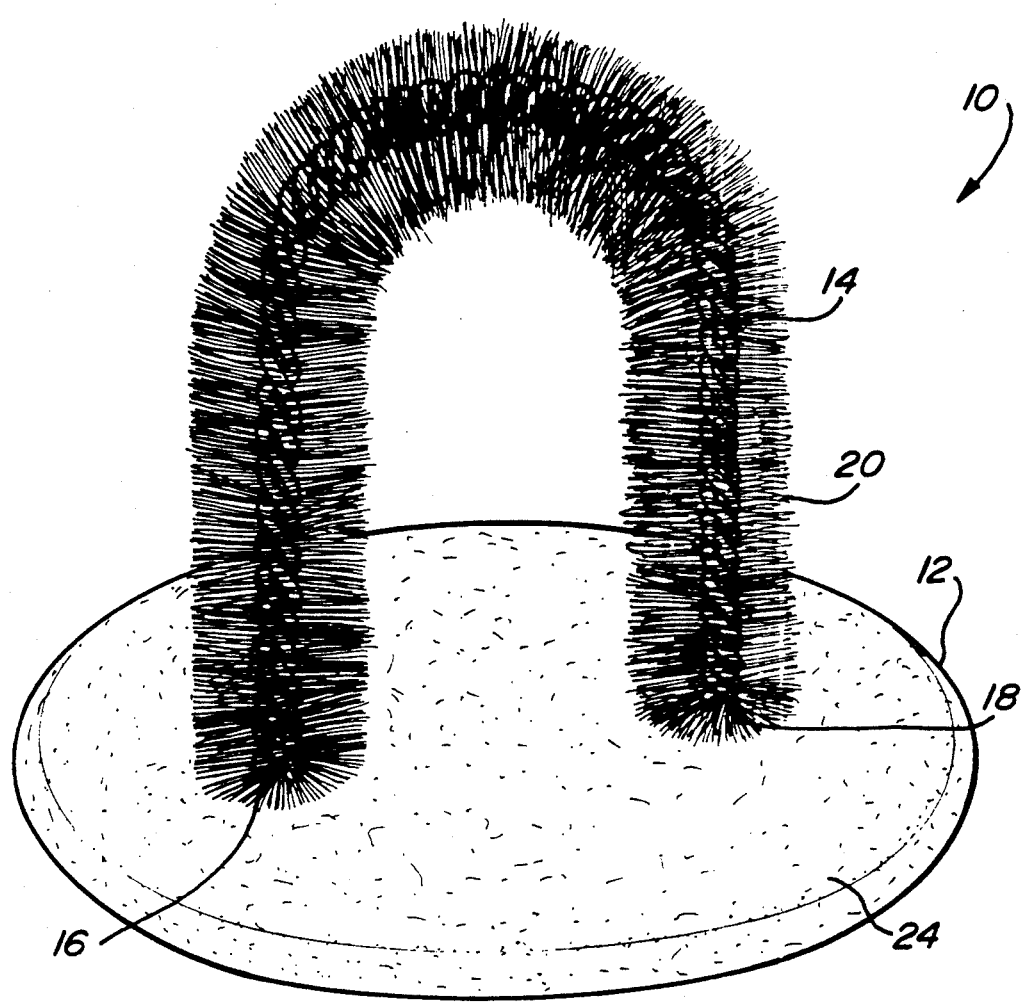
FIG. 1 is a perspective view of the fur grooming apparatus.

At least a portion of the wire 14 includes a spiral twist therein. As shown in FIG. 1, the entire length of the wire 14 is twisted. However, portions of the wire could be twisted to provide various configurations of the invention.

Bristles 20 are retained by and extend radially outwardly from the spiral twist of the wire 14 for brushing a live animal as it passes thereagainst. The bristles are retained in the spiral in a manner similar to such device used for cleaning baby bottles. More specifically, brush bristles 14 are engaged within the twists of the wire 14 and thereby securely retained therein. The twists of the wire 14 are tightly made so as to prevent shifting or loosening of the bristles 20 therefrom. The bristles 20 extend radially outwardly from the wire 14. As shown in FIG. 1, the bristles extend radially outwardly along a complete 360° circumference of the wire. Accordingly, the present invention provides a fur grooming apparatus whereby the animal can either go through the arch shaped wire 14 having the brush bristles 20 extending radially inwardly into the arch or the animal can pass along the outside of the arch and brush its fur in this manner. The brush effectively removes hair balls and other clumpy material from the animals' fur.

The brush bristles can be cleanable nylon bristles or other various bristles known in the art.

An elastic material 24, such as a carpet material, is fastened over the surface of the base 12. A bore 26 is made through the base 12, preferably through the center of the base. A cat attracting substance, such as catnip, can be poured through the bore 26. The elastic material 24 is then stretched from the inner surface 8 of the bore 26 thereby allowing the catnip to spread between the elastic material 24 and the upper surface 28 of the base 12. Applicant has found that this effectively attracts the animal, such as a cat, to the device and greatly increases the use of the device by the animal.

The device 10 made in accordance with the present invention can be easily manufactured by first twisting the wire 14 about the bristles thereby retaining the bristles therein. The wire 14 is then made into the desired shape, such as shown in FIG. 1. The ends 16,18 of the wire 14 are then fixedly fastened to the base 12. In view of the above, it is recognized that the present invention provides an inexpensive and easily manufactured device providing cost savings and manufacturing efficiency over prior devices while still providing an effective fur grooming apparatus.

The invention has been described in an illustrative manner, and it is to be understood that the terminology which has been used is intended to be in the nature of words of description rather of limitation.

Obviously, many modifications and variations of the present invention are possible in light of the above teachings. It is, therefore, to be understood that within the scope of the appended claims, the invention may be practiced otherwise than as specifically described.

I claim:

1. A fur grooming apparatus comprising: a base portion; wire means operatively connected to said base portion, at least a portion of said wire means including a spiral twist therein; and bristle means retained by and extending radially outwardly from said spiral twist for brushing a live animal as it passes thereagainst, said wire means consisting of a wire cord spiral twisted about the entire length thereof, said brush means being retained by and extending radially outwardly from said spiral twist along said entire length of said wire means, said wire means including two end portions, each of said end portions being operatively connected to said base portion, said wire means forming an arch shape, said two end portions being spaced from each other, said base including two holes extending therethrough, said end portions extending through said holes, said apparatus including fastening means for fastening said end portions to said base portion about said holes such that an animal can scratch on the brush through the inside and outside of the arch.

2. A fur grooming apparatus as set forth in claim 1 wherein said brush means extends radially outwardly about a 360° circumference of said wire means.

3. A fur grooming apparatus as set forth in claim 2 wherein said wire means consists of a wire cord spiral twisted about the entire length thereof, said brush means being retained by and extending radially outwardly from said spiral twist along said entire length of said wire means.

4. A fur grooming apparatus as set forth in claim 3 wherein said wire means includes two end portions, each of said end portions being operatively connected to said base portion.

5. A fur grooming apparatus as set forth in claim 4 wherein said wire means form an arch shape, said two end portions being spaced from each other, said base including two holes extending therethrough, said end portions extending through said holes, said apparatus including fastening means for fastening said end portions to said base portion about said holes.

6. A fur grooming apparatus as claimed in claim 1 wherein said base portion includes an upper surface, said wire means extending from said upper surface, said apparatus including elastic means being disposed over said upper surface and being displaced therefrom.

7. A fur grooming apparatus as claimed in claim 6 wherein said base portion includes a bore extending therethrough for allowing access to said upper surface beneath said elastic means.

8. A fur grooming apparatus as claimed in claim 7 wherein said bore extends from said upper surface to a bottom surface of said base portion.

9. A method of making a fur grooming apparatus includes the steps of: twisting a wire about a plurality of bristles and retaining the bristles in the twists of the wire, the bristles extending radially outwardly from the wire forming the wire into an arch and connecting the ends of the wire to a base at spaced locations such that a fur growing animal can scratch on the brush through the inside and outside of the arch.

* * * * *